(12) United States Patent
Simon et al.

(10) Patent No.: US 8,430,440 B1
(45) Date of Patent: Apr. 30, 2013

(54) CONSOLE DOOR THAT PIVOTS AND STOWS

(75) Inventors: Scott Simon, Dexter, MI (US); Brian Robb, Ypsilanti, MI (US); Tony Anthony Oldani, Canton, MI (US); Gregory Claire, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/327,921

(22) Filed: Dec. 16, 2011

(51) Int. Cl.
*B60R 7/04* (2006.01)

(52) U.S. Cl.
USPC ...................................... 296/24.34; 296/37.8

(58) Field of Classification Search ................. 296/37.8, 296/24.34; 220/263
See application file for complete search history.

(56) References Cited

U.S. PATENT DOCUMENTS

| | | | |
|---|---|---|---|
| 3,193,673 A | 7/1965 | Herring | |
| 6,419,314 B1 | 7/2002 | Scheerhorn | |
| 7,063,225 B2 * | 6/2006 | Fukuo | 220/264 |
| 7,234,746 B2 * | 6/2007 | Sakakibara et al. | 296/24.34 |
| 8,074,832 B2 * | 12/2011 | Fujiwara et al. | 220/811 |
| 8,186,734 B2 * | 5/2012 | Nakaya | 296/24.34 |
| 2003/0010786 A1 | 1/2003 | Sambonmatsu | |
| 2010/0050380 A1 | 3/2010 | Fujiwara et al. | |

FOREIGN PATENT DOCUMENTS

GB 2365489 A 2/2002

* cited by examiner

*Primary Examiner* — Joseph Pape
(74) *Attorney, Agent, or Firm* — Vichit Chea; Price Heneveld LLP

(57) ABSTRACT

A storage assembly for use in conjunction with an interior vehicle console includes a housing, a storage compartment, and a cover. The cover is movable between an open position and a closed position along a rotational axis of movement and also movable along a vertical axis of movement from the open position to a stowed position where the cover is concealed, allowing full access to the storage compartment. The movement of the door along the rotational axis of movement occurs substantially outside of the console. The movement of the door further actuates an ambient light feature and is dampened along the rotational axis of movement and the vertical axis of movement. The storage assembly further comprises latching mechanisms which are used to retain the door in the closed position as well as the stowed position.

15 Claims, 5 Drawing Sheets

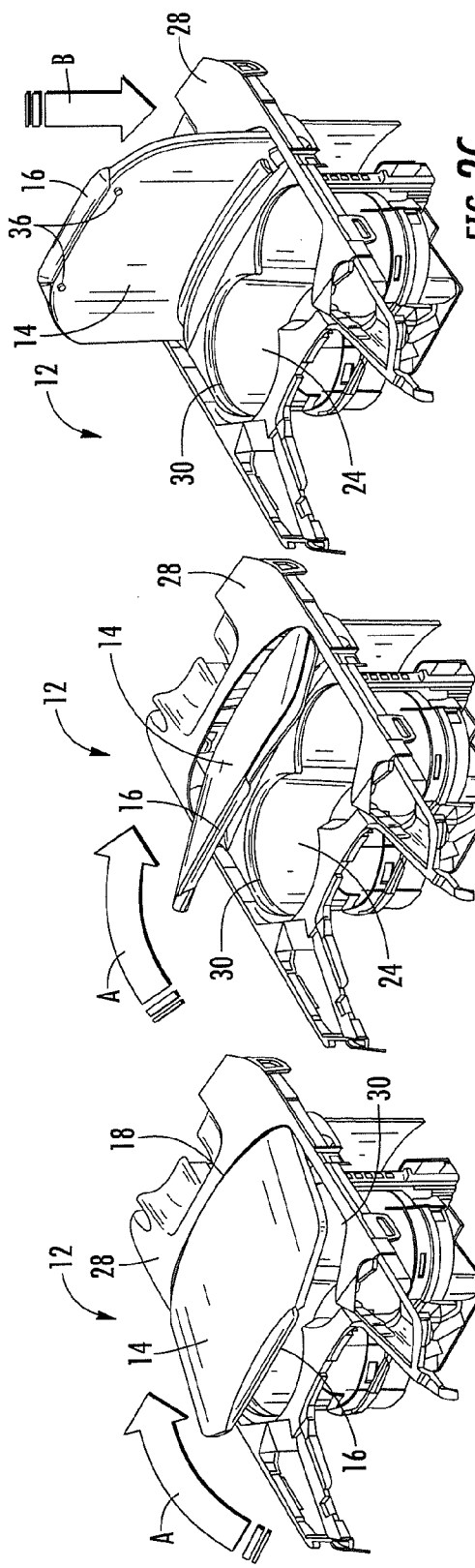

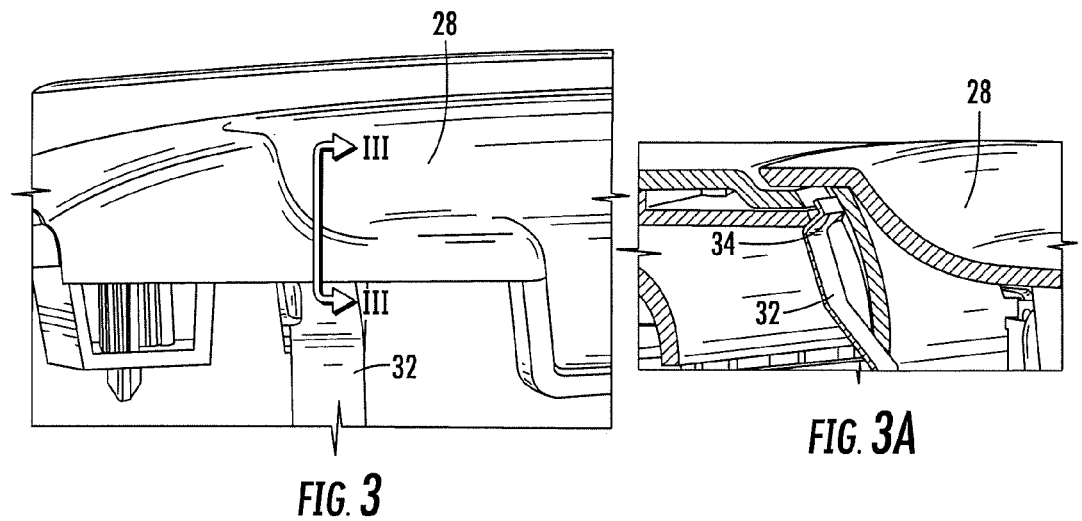
FIG. 3
FIG. 3A
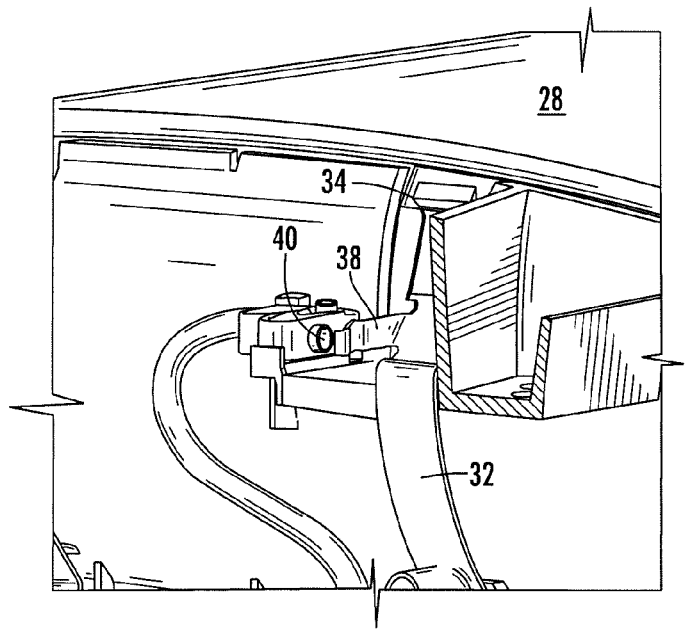
FIG. 4

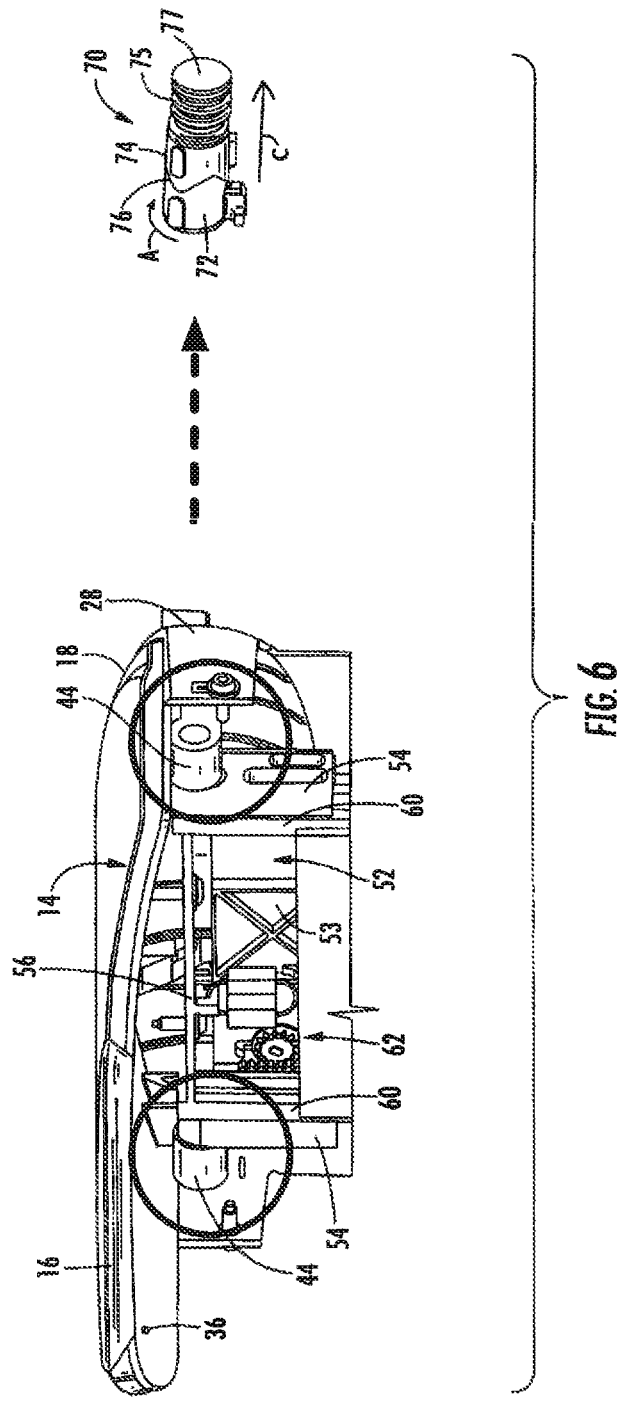

CONSOLE DOOR THAT PIVOTS AND STOWS

FIELD OF THE INVENTION

The present invention generally relates to a storage assembly for use within a vehicle console, and, more particularly, to a storage assembly having a door that is operable between open, closed, and stowed positions.

BACKGROUND OF THE INVENTION

Automotive interior consoles typically feature storage areas or cup holders for driver and passenger convenience. For styling purposes and to conceal stored items, it is desired to have the storage compartments covered with some type of cover or door when the cup holder or storage unit is not in use. Generally, automotive interior console environments comprise many features and devices, such that available packaging space for a cover or door mechanism is very limited. The available packaging space must support the door body as well as the assembly used to actuate and control movement of the door between a closed state and an open state. For this reason, many door mechanisms have very limited travel, occupy considerable wasted space in the console, cannot stow out of sight for a more finished appearance, or are coupled to space wasting actuating assemblies that take up a considerable amount of the already limited console space. As the already limited console space is occupied to accommodate door assemblies and the mechanisms used to operate the door assemblies, storage space and cup holder size is further limited, or door assemblies are not featured at all.

The present invention provides a storage unit having a cover assembly that is operable between open, closed, and stowed positions that has a minimal footprint on the available space in the console, such that larger storage areas and cup holder designs can be accommodated.

SUMMARY OF THE INVENTION

One aspect of the present invention is a storage assembly for a vehicle console wherein the storage assembly includes a housing and a storage compartment operably coupled to the housing. The storage compartment has an opening and a cover wherein the cover is pivotally coupled to a shuttle assembly for substantially covering the opening of the storage compartment when the cover is in a closed position. The cover allows access to the storage compartment when in an open position. The shuttle assembly is adapted to shuttle the cover from the open position to a stowed position when the storage compartment is in use.

Another aspect of the present invention is a storage assembly for a vehicle console wherein the storage assembly includes a housing and a storage compartment operably coupled to the housing, wherein the storage compartment has an opening. A cover is movably associated with the storage compartment, such that the cover is movable between a closed position, an open position, and a stowed position. The cover is further coupled to a shuttle assembly adapted to vertically move the cover to the stowed position from the open position.

Yet another aspect of the present invention is a storage assembly for a vehicle console comprising a housing and a cup holder compartment operably coupled to the housing. A cover is pivotally movable in relation to the housing between a closed position and an open position along a rotational axis of movement. A shuttle assembly is operably coupled to the cover and adapted to move the cover along a vertical axis of movement from the open position to a stowed position.

These and other aspects, objects, and features of the present invention will be understood and appreciated by those skilled in the art upon studying the following specification, claims, and appended drawings.

BRIEF DESCRIPTION OF DRAWINGS

In the drawings:

FIGS. 2A-2E are perspective views of a storage unit illustrating relative movement of a cover assembly;

FIG. 3 is a fragmentary view of a storage unit housing;

FIG. 3A is a fragmentary cross-sectional view, taken along line of FIG. 3, of a housing assembly;

FIG. 4 is a perspective view of a biasing mechanism and electrical switch assembly;

FIG. 6 is a perspective view of a cover assembly and an actuation mechanism according to another embodiment of the present invention.

DETAILED DESCRIPTION OF PREFERRED EMBODIMENTS

Figure 1:
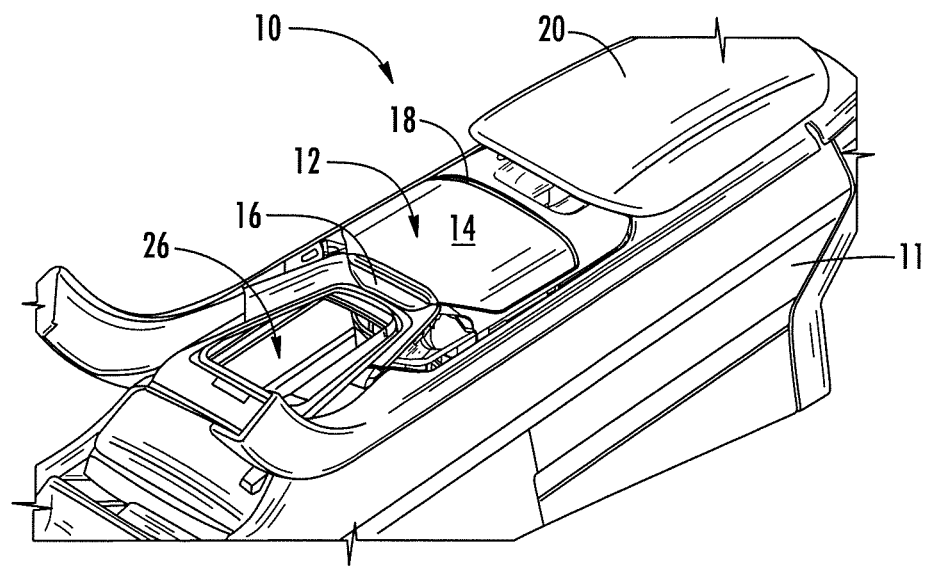
FIG. 1 is a fragmented perspective view of a storage unit disposed in a vehicle center console having a door in a closed position according to one embodiment of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Figure 1A:
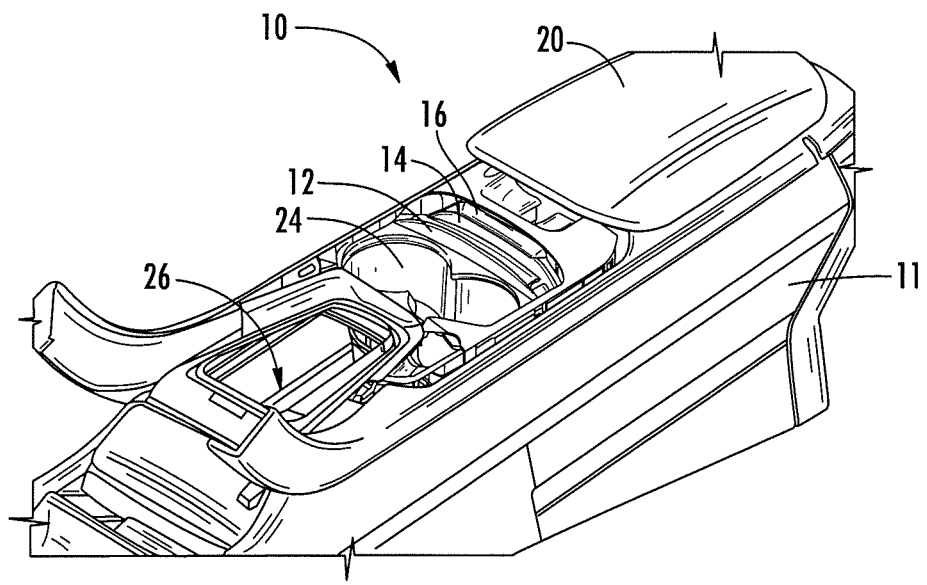
FIG. 1A is a fragmented perspective a storage unit disposed in a vehicle center console having a door in a stowed position.

Referring to FIGS. 1 and 1A, the reference numeral 10 generally designates a vehicle center console having a storage assembly 12 according to the present invention. The vehicle console 10 may be mounted by a base portion 11 to a vehicle, such that the vehicle console 10 is disposed essentially between the driver's and passenger's front seats. As readily evident to those skilled in the art, the console 10 may be disposed at any desirable location in a motor vehicle without departing from the scope of the present invention. As shown in FIGS. 1 and 1A, the storage assembly 12 further comprises a cover or door 14 having a leading edge 16 and a rear edge 18. As shown in FIG. 1A, the cover is movable between a closed position (FIG. 1) and a stowed position (FIG. 1A) where the cover 14 is fully concealed within an interior of the vehicle console 10 and the leading edge 16 is still accessible. As shown in FIG. 1A, when cover 14 is in the stowed position, a storage compartment 24 is fully accessible and, in the embodiment shown in FIG. 1A, the storage compartment further comprises a cup holder assembly. The vehicle console 10, as shown in FIGS. 1 and 1A, further comprises a centrally located armrest 20 and other standard features, such as an aperture 26 for housing a gear shifting mechanism.

As shown in FIGS. 2A-2E, the storage assembly 12 is shown disposed within a housing 28 and movement of the cover 14 is depicted. Specifically, from FIG. 1 to FIG. 2A, the cover 14 is shown moving from a closed position (FIG. 1) to a partially open position (FIG. 2A). The cover 14 is shown again in a partially open position in FIG. 2B and a fully open position in FIG. 2C. The cover 14 moves from the closed position (FIG. 1) to the open position (FIG. 2C) along a rotational axis of movement, as indicated by arrows A (FIGS. 2A and 2B). When the cover 14 is in the open position (FIG. 2C), the storage compartment 24 housing the cup holders is accessible. For purposes of this description, it is noted that the storage compartment 24 can have a variety of configurations beyond that of a cup holder as exemplified in the figures. The cover 14 moves along the rotational axis A between open and closed positions in dampened and controlled manner as further described below. When the cover 14 is in the open position as shown in FIG. 2C, an opening 30 disposed on the cup holder assembly 20 is revealed. When the cover 14 is in the closed position, as shown in FIG. 1, the opening 30 is substantially covered by the cover 14. As shown in FIGS. 2C-2E, the cover 14 is further movable along a vertical axis of movement as indicated by arrows B. In this way, the cover 14 can move from an open position, as shown in FIG. 2C, to a stowed position, as shown in FIG. 2E. Movement along the vertical axis B is further described below.

When moving the cover 14 from the closed position to the open position, the cover is lifted manually by the user from its leading edge 16 and rotated approximately 90° upward along the rotational axis of movement A to the fully open position as shown in FIG. 2C. The cup holder 24, having cup holder wells, is exposed and accessible when cover 14 is in the fully open position. To close door 14 from the open position, the leading edge 16 is manually rotated approximately 90° back downward until the door 14 reaches the closed state, as shown in FIG. 1. The door can be retained in this closed state using a latching mechanism known in the art such as a push-push locking mechanism. The door or cover 14 can also be retained in the closed or latched state by the use of at least one biasing mechanism such as a leaf spring 32, as shown in FIGS. 3 and 3A. The leaf spring element 32 is disposed near the rear edge 18 (FIG. 1) of the door 14 and comprises a cam element 34 which engages the rear edge 18 of the door 14 during the rotational motion of the door 14 to ensure that motion of the door 14 is controlled along the rotational axis of movement indicated by arrows A in FIGS. 2A and 2B. With the cam element 34 in place, the leaf springs 32 retain the door 14 under forward and downward biasing tension against the housing 28 at bumpers or stops 36, as shown in FIGS. 2C and 2D. The bumpers 36 engage the housing 28 due the biasing forces imparted by the leaf springs 32 and help to prevent noise or vibration caused during vehicle motion. Thus, as the cover or door 14 moves between the open or closed positions, the rear edge 18 of the door 14 will cam along the cam element 34 of the leaf springs 32, thereby controlling movement and the cam elements will ensure that the door 14 will remain under tension in the closed position by engagement of bumpers 36 with the housing 28 creating a latched state.

As shown in FIG. 4, a leaf spring 32 can further include a tab mechanism 38 which contacts a micro switch 40 which activates an ambient light feature in the storage compartment or cup holder wells 24 when the cover 14 is in the open or stowed position to illuminate the storage area. The camming motion of the leaf spring 32 by the cam element 34 against the rear edge of the door 14 imparts movement of the tab 38 to engage a micro switch 40 which activates the light feature.

Figure 5:
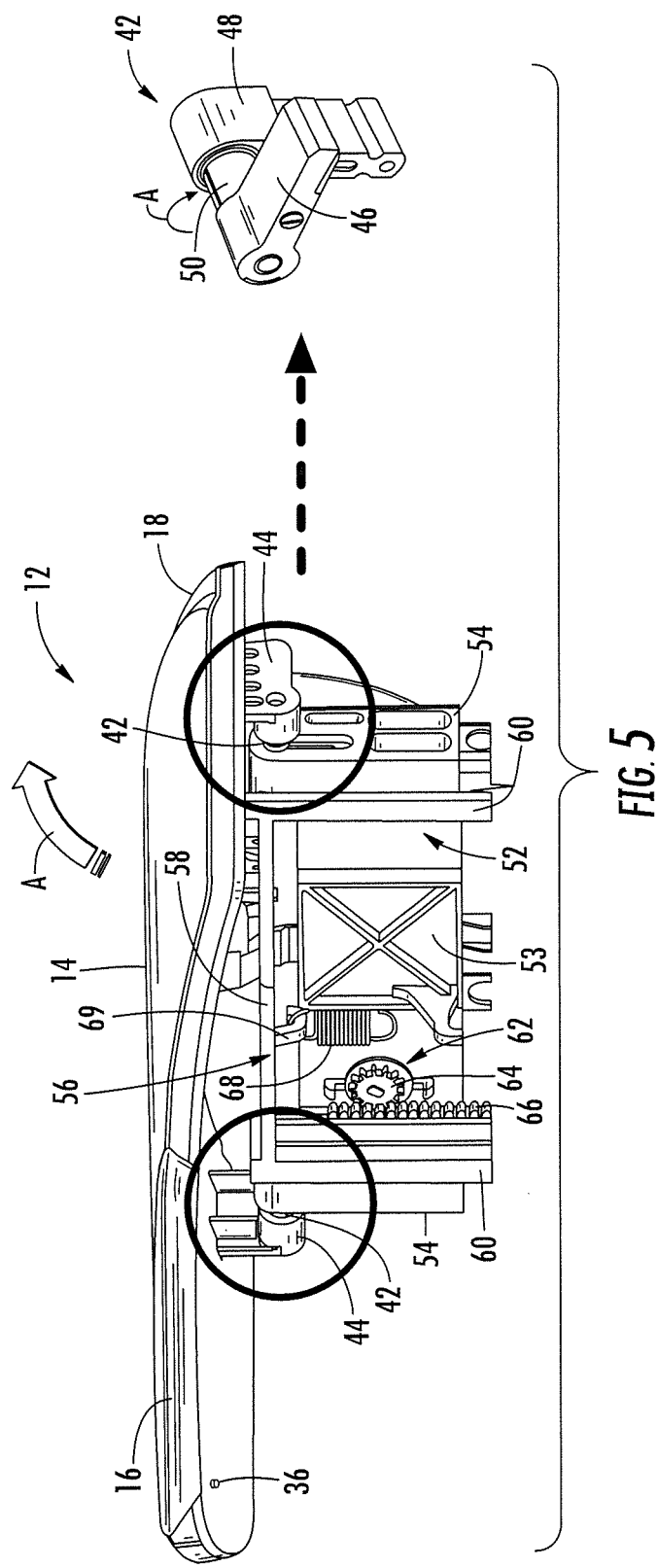
FIG. 5 is a perspective view of a cover assembly and actuation mechanism.

In the embodiment shown in FIG. 5, the motion of the door 14 is further controlled along the rotational axis A by use of constant torque hinges 42 disposed at door pivot points 44 disposed on either side of the door 14 near the rear edge 18. The constant torque hinges 42 ensure fluid and uniform force is required to rotate the door 14 substantially 90° along the rotational axis of movement when opening or closing. As shown in FIG. 5, the constant torque hinge 42 has a first hinge member 46 and a second hinge member 48 which are connected by a connecting member 50 wherein the connecting member 50 has a resilient member disposed therein for providing constant and even friction along the rotational axis of movement A in both an opening or closing motion. In assembly, the first hinge member 46 is connected to a shuttle mechanism 52 at an outer side wall 54 of the shuttle mechanism 52. The second hinge member 48 is connected to the pivot points 44 disposed near the rear edge 18 of the door 14. In this way, the door 14 is operably and pivotally coupled to the shuttle mechanism 52.

As shown in FIG. 5, the shuttle mechanism 52 has a main body portion 53 with side walls 54 disposed on either side of the body portion 53 giving the shuttle mechanism 52 an overall generally U-shaped configuration. The side walls 54 connect to the constant torque hinges 42 of the door 14 as described above. The shuttle mechanism 52 is further coupled to a rack mechanism 56 which is also coupled to the housing 28. The rack component 56 comprises a pair of racks 60 disposed on either side of a connector 58 which serve as guides for the shuttle mechanism 52. In assembly, the rack component 56 is operably coupled to the shuttle mechanism 52 by engagement of the racks 60 and the side walls 54 of the shuttle mechanism 52, such that, the rack component 56 is essentially nested in the generally U-shaped configuration of the shuttle mechanism 52. In the embodiment shown in FIG. 5, a dampening mechanism 62 having a gear wheel 64 is disposed on the body portion 53 of the shuttle mechanism 52. In this embodiment, the left rack 60 of the rack component 56 has a row of mating gear teeth 66 which engage gear wheel 64 of damping mechanism 62. The dampening mechanism 62 can be a viscous damper known in the art, such that the dampening mechanism 62 dampens the motion of the cover 14 as it moves vertically downward from an open position to a stowed position. A biasing mechanism shown in the form of a spring 68 is operably coupled to the rack component 56 at a flange 69 disposed on connector 58. The spring 68 is further coupled to the shuttle mechanism 52 such that the spring 68 is loaded manually during vertically downward movement of the door 14 and unloaded during vertically upward movement of door 14 along the vertical axis of movement B (FIGS. 2D, 2E). The mechanical engagement of the shuttle and the rack mechanisms is such that forces that act on the door 14 to move the door 14 vertically downward to the stowed position from the open position are evenly distributed from side to side, so as to avoid binding of door 14 during vertical movement along the vertical axis of motion B. A push-push latch mechanism known in the art may be used to latch the door 14 in the stowed position so as to retain door 14 in the stowed position under tension to reduce vibration due to vehicle motion and control the fit and finish of the door 14 as stowed. While stowed, the door 14 provides unencumbered access to the storage compartment 24. To move the door 14 from the stowed position to the open position, the door 14 is unlatched by pushing downward along the vertical axis of movement B at the front edge 16 of the door when a push-push latching mechanism is used. The door 14 will then move upward along the vertical axis of movement B in a dampened manner due to the dampening mechanism 62 described above. When a fully automated push-push latch is not incorporated, the door 14 can also be manually lifted by vehicle occupant by engaging the accessible front edge 16 of the door 14 and lifting the door upward along the vertical axis B to the open position. It is further contemplated that a micro switch, such as micro switch 40 shown in FIG. 4, can be positioned on a rack 60 for activation by the shuttle mechanism 52 when the door 14 is in the stowed position.

In the embodiment shown in FIG. 6, bi-stable hinges 70 can be used to pivotally couple the door 14 at pivot points 44 to the side walls 54 of the shuttle mechanism 52. As shown in FIG. 6, the bi-stable hinges 70 comprise a first hinge member 72 which is coupled to a side wall 54 of the shuttle mechanism 52 in assembly, and a second hinge member 74 which is coupled to a pivot point 44 of door 14. The first and second hinge members 72 and 74, respectively, as shown in FIG. 6, are rotationally engaged with one another along cam edges indicated at a cam line 76. Thus, during operation, the bi-stable hinges 70 cam to urge movement of the door 14 to the open position as the door is moved from the closed position to the open position, as well as urge movement of the door 14 to the closed position as the door 14 moves from the open position to the closed position. The bi-stable hinges 70 impart intuitive function to the operation of the door 14 while providing smooth dynamics of movement along the rotational axis as well as mitigating vibration of the door 14 as coupled to the shuttle mechanism 52.

As further shown in FIG. 6, the bi-stable hinge assembly 70 comprise an abutment member 77 coupled to a biasing spring member 75 which biases the second hinge member 74 towards an engaged position with the first hinge member 72 as shown in FIG. 6. Thus, as the door or cover 14 rotates while coupled to second hinge member 74, the second hinge member 74 will cam along the cam line 76 in relation to first hinge member 72 such that the second hinge member 74 will move laterally towards the abutment member 77 in a direction as indicated by arrow C until the lid or cover 14 has reached an open or closed position. In this way, the first and second hinge members 72, 74 separate to allow rotation of the second hinge member 74 with the door 14. As the cover or door 14 nears the open or closed position, the biasing spring 75 will bias the second hinge member 74 into an engaged position, as shown in FIG. 6, such that the bi-stable hinge mechanism 70 acts in a manner similar to a clam-shell style cellular phone, wherein the phone opens and closes and remains open or closed by snapping into place as the cover nears the open or closed position. Thus, the first hinge member 72 is a stationary hinge member as coupled to the shuttle mechanism 52, while the second hinge member 74 rotates with the cover or door 14 as the cover or door rotates between the open and closed position.

As noted above, the door 14 of the present invention is operable along 2 separate axes of motion; the rotational axis A (FIGS. 2A-2C) and the vertical axis B (FIGS. 2D, 2E). The rotational axis A demonstrates movement of the door 14 between open (FIG. 2C) and closed (FIG. 1) positions. The vertical axis B demonstrates movement of the door 14 between open (FIG. 2C) and stowed (FIG. 2E) positions. The separate and distinct axes of movement allow for an overall minimized footprint of the door and the mechanisms used to operate the door such as the hinges, rack and shuttle mechanisms. In this way, the door, and accompanying mechanisms for moving the door, do not take up unnecessary console space which is already limited. Commonly, doors known in the art have one axis of movement for opening and closing a storage compartment. This often results in doors which do not fully stow for a concealed appearance and greater access to the storage compartment, or the door travel limits the space the storage unit can occupy as the door may rotate or otherwise slide into the console space that could be used for a larger storage unit. The present invention comprises a door that rotates along a rotational axis of movement, wherein the rotation of the door takes place substantially above and adjacent to the console and therefore, outside of the console space. This adjacent rotation that substantially does not occupy console space is shown in FIGS. 2A-2E as indicated by arrows A. The door then stows vertically along the vertical axis of movement in a slim profile adjacent the storage area near the rear of the storage area. In this way, the storage compartment length and depth is not conditioned on the movement of the door as found in other storage assemblies.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A storage assembly for a vehicle console, comprising:
a housing;
a storage compartment disposed within the housing having an opening;
a cover pivotally coupled to a shuttle assembly for substantially covering the opening in a closed position and allowing access to the storage compartment in an open position;
wherein the cover is rotatably moveable between the open position and the closed position along a rotational axis of movement disposed substantially above the storage compartment; and
wherein the shuttle assembly is adapted to shuttle the cover from the open position to a vertically stowed position substantially within the housing.

2. A storage assembly as set forth in claim 1, including:
constant-torque hinges for controlling movement of the cover along the rotational axis of movement between open and closed positions.

3. A storage assembly as set forth in claim 1, including:
bi-stable hinges for controlling movement of the cover along the rotational axis of movement between open and closed positions.

4. A storage assembly as set forth in claim 1, wherein:
the shuttle assembly shuttles the cover along a vertical axis of movement from the open position to the stowed position.

5. A storage assembly as set forth in claim 4, including:
a rack mechanism coupled to the shuttle assembly and the housing wherein the rack mechanism is adapted to evenly distribute forces acting on the cover along the vertical axis of movement to avoid binding of the cover as it moves between the open position and the stowed position.

6. A storage assembly as set forth in claim 4, including:
a first biasing mechanism for biasing the cover towards the closed position; and
a second biasing mechanism for biasing the cover vertically upward towards the open position from the stowed position.

7. A storage assembly as set forth in claim 6, wherein:
the first biasing mechanism comprises at least one leaf spring acting on a rear edge of the cover to control movement of the cover along the rotational axis of movement, wherein the at least one leaf spring further comprises a tab for contacting and actuating an electric micro switch when the cover is in the open or stowed position which further activates a light module disposed in the storage compartment.

8. A storage assembly as set forth in claim 7, wherein:
the second biasing mechanism comprises a progressively loaded spring that loads as the cover is moved along the vertical axis of movement from the open position to the stowed position.

9. A storage assembly as set forth in claim 8, wherein:
the shuttle assembly further comprises at least one damper mechanism that engages the rack mechanism for controlling movement of the cover from the stowed position to the open position.

10. A storage assembly for a vehicle console, comprising:
a housing;
a storage compartment disposed within the housing having an opening;
a cover moveably associated with the storage compartment between a closed position, an open position and a stowed position, wherein the cover is coupled to a shuttle assembly adapted to vertically move the cover to the stowed position within the housing;
a first biasing mechanism for biasing the cover towards the closed position; and
a second biasing mechanism for biasing the cover vertically upward towards the open position from the stowed position.

11. A storage assembly as set forth in claim 10, wherein:
the cover is rotatably moveable between the open position and the closed position along a rotational axis of movement, and further wherein the cover substantially covers the opening in the closed position.

12. A storage assembly as set forth in claim 10, wherein:
the shuttle assembly further comprises at least one damper mechanism that engages a rack mechanism for controlling movement of the cover from the stowed position to the open position, and further wherein the rack mechanism is adapted to evenly distribute forces acting on the cover to avoid binding of the cover as it moves vertically between the open and stowed positions.

13. A storage assembly for a vehicle console, comprising:
a housing;
a cup holder compartment disposed within the housing;
a cover pivotally moveable in relation to the housing between open and closed positions along a rotational axis disposed substantially above the cup holder compartment; and
a shuttle assembly operably coupled to the cover and adapted to move the cover along a vertical axis from the open position to a stowed position within the housing.

14. A storage assembly as set forth in claim 13, including:
bi-stable hinges for controlling and dampening movement of the cover along the rotational axis between the open position and the closed position.

15. A storage assembly as set forth in claim 13, wherein:
the shuttle assembly further comprises at least one damper mechanism that engages a rack mechanism for controlling movement of the cover from the stowed position to the open position along the vertical axis, and further wherein the rack mechanism is adapted to evenly distribute forces acting on the cover to avoid binding of the cover as it moves vertically between the open and stowed positions.

\* \* \* \* \*